April 11, 1967 W. O. MONGESKU ETAL 3,313,587

DIAL ASSEMBLY

Filed Oct. 21, 1965

INVENTORS:
WILLIAM O. MONGESKU,
RALPH W. RICHTER,

BY Norman C. Fulmer
THEIR ATTORNEY.

United States Patent Office 3,313,587
Patented Apr. 11, 1967

3,313,587
DIAL ASSEMBLY
William O. Mongesku, Syracuse, and Ralph W. Richter, Whitesboro, N.Y., assignors to General Electric Company, a corporation of New York
Filed Oct. 21, 1965, Ser. No. 500,035
4 Claims. (Cl. 312—333)

This invention relates to dial assemblies, and particularly to an arrangement for assembling a dial member into a radio or the like.

The invention is applicable to a variety of electrical apparatus employing a dial member and a chassis board. For convenience it will particularly be described as applied to radios.

Dial members, such as numbered dial scales, or backgrounds over which a dial pointer moves, are usually attached to the radio cabinet and/or chassis by means of screws or other conventional fastening devices.

An object of the invention is to provide an improved dial arrangement.

Another object is to provide a dial assembly which does not require the use of conventional fastening devices.

A further object is to provide an improved dial arrangement which is economical to manufacture and which is quick and easy to assemble.

Additional objects will be apparent from the following description and claims, and from the accompanying drawing.

The dial assembly of the invention comprises, briefly and in a preferred embodiment, a dial member provided with a pair of spaced-apart mutually parallel arms. The mutually facing sides of these arms are respectively provided with parallel slots adapted to receive opposite edges of a chassis board. The arms are somewhat resilient and are provided with ramp latches adapted to engage notches of the circuit board when the circuit board is caused to slide into the slots of the dial member, thereby locking the circuit board and dial member together. A further feature of the invention is the provision of ribs on the opposite sides of the arms to provide, in effect, extensions of the opposite edges of the chassis board so that the assembled chassis and dial member can be inserted into slots of a cabinet of a radio or the like, in the manner disclosed and claimed in our copending patent application Ser. No. 423,149, filed Jan. 4, 1965.

Figure 1:
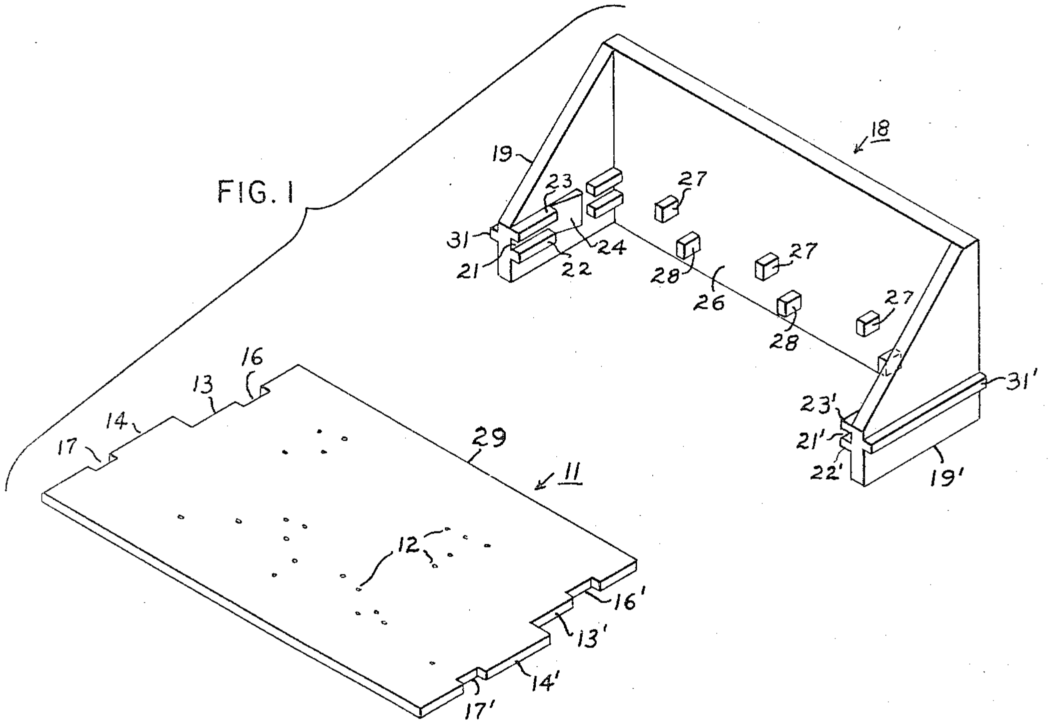
FIG. 1 is a perspective view of a chassis board and dial member when unassembled.

A chassis board 11, which may be a printed-circuit board containing circuit components mounted in openings 12, has two opposite edges stepped to provide first portions 13, 13′ spaced a certain distance apart and second portions 14, 14′ spaced a certain distance apart which is greater than that of the first portions, as will be apparent. The first edge portions are respectively provided with notches 16, 16′ and the second edge portions are respectively provided with notches 17, 17′.

A dial member 18 is provided with a pair of spaced-apart mutually parallel arms 19, 19′, which are respectively provided with a pair of mutually parallel slots 21, 21′ on the mutually facing sides thereof. These slots may be defined by a pair of ribs 22, 23 on the arm 19 and a pair of ribs 22′, 23′ on the arm 19′. The slots 21, 21′ are adapted to respectively receive the first edge portions 13 and 13′ of the chassis board 11, so that the board 11 can be caused to slide into the slots 21, 21′. The slots are, of course, slightly wider than the thickness of the board 11.

A pair of ramp latches 24, 24′ are respectively provided on the inner surfaces of the arms 19, 19′ and are adapted to enter into the notches 16, 16′ of the chassis board 11 to hold this chassis board securely locked in position in the slots 21, 21′, so that the chassis board 11 and the dial member 18 will be locked together in assembled position. The arms 19 and 19′ are sufficiently resilient to deflect slightly to permit the first parts of the edge portions 13 and 13′ to ride past the ramp latches 24, 24′ while the circuit board 11 is being inserted into the slots 21, 21′. Preferably, the entire dial member 18 is a one-piece member molded from slightly resilient plastic material. The rear surface 26 of the front portion of the dial member 18 may be provided with an upper row of posts 27 and a lower row of posts 28, located to be immediately above and below, respectively, the front edge 29 of the chassis board 11 when in assembled position to give added support to the chassis board.

Figure 2:
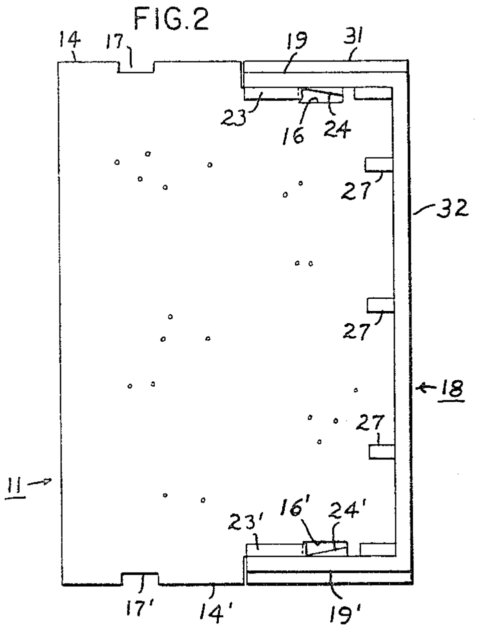
FIG. 2 is a top view of the chassis board and dial member when assembled.
Figure 3:
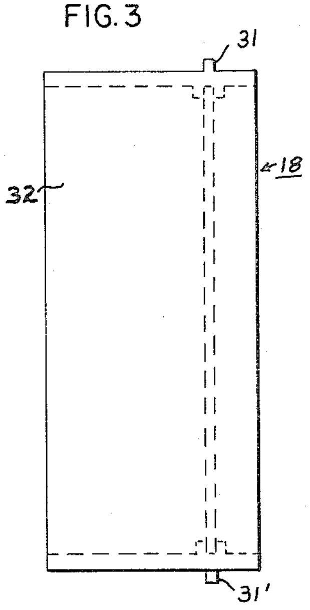
FIG. 3 is a front view of the assembled combination, looking toward the right side of FIG. 2.

Ribs 31, 31′ are respectively provided on the outer surfaces of the arms 19, 19′ in alignment with the slots 21 and 21′, as shown. These ribs are dimensioned, with respect to the second edge portions 14, 14′ of the circuit board 11, to provide in effect a continuation or extension of the second edge portions 14, 14′, as shown in FIG. 2. Thus, the assembled combination will be provided with an edge 14, 31 and an opposite parallel edge 14′, 31′ adapted to slide into slots of a cabinet for a radio or the like, the notches 17, 17′ being adapted to be engaged by locking latches, as described in the aforesaid patent application Ser. No. 423,149. For this application, the front of the cabinet will be provided with a dial opening which will lie immediately in front of the front surface 32 of the dial member 18. The front surface 32 of the dial member 18 may be provided with a dial-scale indicia over which a dial pointer moves, or the surface 32 may be blank and the dial-scale indicia may be provided on the cabinet or on a window member located at the cabinet dial opening.

It will be apparent that the snap-together dial assembly of the invention achieves the objectives of providing a low-cost easily assembled dial arrangement which does not require the use of conventional fastening devices.

While a preferred embodiment of the invention has been shown and described, other embodiments and modifications will be apparent to persons skilled in the art and will fall within the scope of invention as defined in the following claims.

What we claim is:

1. A dial assembly comprising a dial member provided with a pair of spaced-apart mutually parallel arms and a pair of mutually parallel slots respectively provided on the mutually facing surfaces of said arms, a chassis board having mutually opposite edges adapted to slide into said slots, respectively, and means to lock said chassis board and said dial member together.

2. An assembly as claimed in claim 1, in which said means to lock the chassis board and dial member together comprises a notch in at least one of said edges of the chassis board and a ramp-latch on at least one of said arms adapted to engage said notch to hold the chassis board and dial member locked together, said arms being sufficiently resilient to permit the leading portion of said circuit board to ride over said ramp latch.

3. An assembly as claimed in claim 1, in which the outer surfaces of said arms are each provided with a rib extending parallel to said slots.

4. A dial assembly comprising a dial member provided with a pair of spaced-apart mutually parallel arms and a pair of mutually parallel slots respectively provided on the mutually facing surfaces of said arms, a chassis board having two opposite edges stepped to provide first edge portions spaced a lesser distance apart than the remaining second edge portions, means providing a notch in at least one of said first edge portions, said first edge portions being adapted to slide into said slots, respectively, at least one of said arms being provided with a ramp latch to engage said notch and hold the chassis board and dial member locked together, said arms being sufficiently resilient to permit the leading portion of said circuit board to ride over said ramp latch, said second edge portions of the chassis board being dimensioned to extend outwardly beyond the outer surfaces of said arms, and ribs provided on said outer surfaces of the arms to effectively function as extensions of said second edge portions of the chassis board.

References Cited by the Examiner

UNITED STATES PATENTS

| | | | |
|---|---|---|---|
| 2,871,324 | 1/1959 | Budd | 317—101 X |
| 2,880,262 | 3/1959 | Bell et al. | 248—27 X |

CLAUDE A. LE ROY, *Primary Examiner.*

F. DOMOTOR, *Assistant Examiner.*